United States Patent [19]
Gansen et al.

[11] Patent Number: 5,132,334
[45] Date of Patent: Jul. 21, 1992

[54] POLYISOCYANATE MIXTURES AND THEIR USE IN THE PREPARATION OF FLEXIBLE POLYURETHANE FOAMS

[76] Inventors: Peter Gansen, Bayer AG, D 5090 Leverkusen, Bayerwerk, Fed. Rep. of Germany; Hans-Joachim Kogelnik, Mobay Corporation, Mobay Rd., Pittsburgh, Pa. 15205

[21] Appl. No.: 638,719

[22] Filed: Jan. 8, 1991

[30] Foreign Application Priority Data

Jan. 20, 1990 [DE] Fed. Rep. of Germany ....... 4001556

[51] Int. Cl.$^5$ .......................... C08G 18/06; C08J 9/08
[52] U.S. Cl. ..................................... 521/160; 521/114; 521/174
[58] Field of Search ................. 521/160, 108, 114, 174

[56] References Cited
U.S. PATENT DOCUMENTS

| | | | |
|---|---|---|---|
| 3,492,251 | 1/1970 | Gemeinhardt | 521/160 |
| 3,909,464 | 9/1975 | Anorga et al. | 521/160 |
| 4,256,849 | 3/1981 | Ick et al. | 521/129 |
| 4,801,644 | 1/1989 | Coogan | 524/839 |

FOREIGN PATENT DOCUMENTS 2221811 11/1973 Fed. Rep. of Germany.
1057795 2/1967 United Kingdom.

*Primary Examiner*—John Kight, III
*Assistant Examiner*—John M. Cooney, Jr.

[57] ABSTRACT

The present invention relates to polyisocyanate mixtures of
 (A) 21 to 95% by weight of toluene diisocyanate and
 (B) 5 to 79% by weight of a mixture of diphenylmethane diisocyanates and polyphenyl polymethylene polyisocyanates containing (1) 55 to 87% by weight of 4,4'-diphenylmethane diisocyanate, (2) 8 to 30% by weight of 2,4'-diphenylmethane diisocyanate, (3) 0 to 4% by weight of 2,2'-diphenylmethane diisocyanate, and (4) 5 to 35% by weight of polyphenyl polymethylene polyisocyanates.

The invention also relates to a process for preparing flexible polyurethane foams in which polyisocyanate mixtures of the invention are used as the polyisocyanate component.

8 Claims, No Drawings

POLYISOCYANATE MIXTURES AND THEIR USE IN THE PREPARATION OF FLEXIBLE POLYURETHANE FOAMS

BACKGROUND OF THE INVENTION

The present invention relates to polyisocyanate compositions containing toluene diisocyanate and mixtures of diphenylmethane diisocyanate isomers and polyphenyl polymethylene polyisocyanates that provide improvements in the tensile properties of flexible polyurethane foams.

German Offenlegungsschrift 2,221,811 describes the production of a molded flexible polyurethane foam using a mixture of 60 parts by weight toluene diisocyanate ("TDI") and 40 parts by weight of a mixture of diphenylmethane diisocyanates and polyphenyl polymethylene polyisocyanates ("crude MDI") (NCO content 31%). The molded flexible foam obtained in this way is particularly distinguished by favorable flameproof properties, although mechanical properties are not up to today's standards.

In addition, German Patentschrift 1,243,865 describes the production of polyurethane foams using TDI/MDI mixtures having MDI concentrations of 10 to 90% by weight. The crude MDI used contains 40 to 60% by weight of monomeric isomers having low concentrations of the 2,4'-isomer. Although these polyisocyanates are widely used in the automotive and furniture industries, the elongation at break of the polyurethane foams produced from these polyisocyanates is often unsatisfactory, with the result that standard automobile specifications cannot be satisfied.

It has now surprisingly been found that the use of special TDI/MDI mixtures can provide distinct improvements in the tensile properties of flexible polyurethane foams. These new TDI/MDI mixtures differ from the previously known mixtures in their relatively high content of monomeric MDI isomers, more specially 2,4'-MDI.

SUMMARY OF THE INVENTION

Accordingly, the present invention relates to a polyisocyanate mixture comprising
- (A) 21 to 95% by weight of toluene diisocyanate and
- (B) 5 to 79% by weight of a mixture of diphenylmethane diisocyanates and polyphenyl polymethylene polyisocyanates comprising
  - (1) 55 to 87% by weight of 4,4'-diphenylmethane diisocyanate,
  - (2) 8 to 30% by weight of 2,4'-diphenylmethane diisocyanate,
  - (3) 0 to 4% by weight of 2,2'-diphenylmethane diisocyanate, and
  - (4) 5 to 35% by weight of polyphenyl polymethylene polyisocyanates.

A preferred polyisocyanate mixture according to the invention is one in which component (B) comprises
- (1) 60 to 75% by weight of 4,4'-diphenylmethane diisocyanate,
- (2) 10 to 25% by weight of 2,4'-diphenylmethane diisocyanate,
- (3) 1 to 3% by weight of 2,2'-diphenylmethane diisocyanate, and
- (4) 10 to 30% by weight of polyphenyl polymethylene polyisocyanates.

The present invention also relates to a process for the preparation of flexible polyurethane foams comprising reacting
- (a) a polyisocyanate mixture comprising
  - (A) 21 to 95% by weight of toluene diisocyanate and
  - (B) 5 to 79% by weight of a mixture of diphenylmethane diisocyanates and polyphenyl polymethylene polyisocyanates comprising
    - (1) 55 to 87% by weight of 4,4'-diphenylmethane diisocyanate,
    - (2) 8 to 30% by weight of 2,4'-diphenylmethane diisocyanate,
    - (3) 0 to 4% by weight of 2,2'-diphenylmethane diisocyanate, and
    - (4) 5 to 35% by weight of polyphenyl polymethylene polyisocyanates
  with
- (b) compounds containing at least two isocyanate-reactive hydrogen atoms and having a molecular weight in the range from about 400 to about 10,000 and
- (c) optionally, chain-extending agents and/or cross-linking agents containing at least two isocyanate-reactive hydrogen atoms and having a molecular weight in the range from 32 to 399;

in the presence of
- (d) water as blowing agent and
- (e) optionally, other blowing agents, catalysts, and other known auxiliaries and additives.

A polyisocyanate mixture in which component (B) comprises
- (1) 60 to 75% of 4,4'-diphenylmethane diisocyanate,
- (2) 10 to 25% by weight of 2,4'-diphenylmethane diisocyanate,
- (3) 1 to 3% by weight of 2,2'-diphenylmethane diisocyanate, and
- (4) 10 to 30% by weight of polyphenyl polymethylene polyisocyanates is preferably used in the process of the invention.

The invention further relates to cold-curing flexible polyurethane foams produced by foaming a composition prepared according to the invention in a closed mold.

DETAILED DESCRIPTION OF THE INVENTION

The following starting components are used for the production of the flexible polyurethane foams according to the invention.

When carrying out the process according to the invention, component (a) comprises the above-mentioned polyisocyanate mixture of (A) toluene diisocyanate and (B) diphenylmethane diisocyanates and polyphenyl polymethylene polyisocyanates. Suitable toluene diisocyanates include be 2,4- and 2,6-toluene diisocyanate and mixtures of these isomers. Other preferred forms of TDI suitable for the invention include toluene diisocyanate in the form of a mixture of the 2,4- and 2,6-isomers in a ratio of 80:20 ("TDI 80") and toluene diisocyanate in the form of a mixture of the 2,4- and 2,6-isomers in a ratio of 65:35 ("TDI 65").

Suitable compounds for use as component (b) include compounds containing at least two isocyanate-reactive hydrogen atoms and having a molecular weight in the range from about 400 to about 10,000. In addition to compounds containing amino groups, thiol groups, or carboxyl groups, suitable compounds (b) preferably include compounds containing hydroxyl groups, more preferably compounds containing 2 to 8 hydroxyl groups, particularly those having molecular weights in the range from about 1,000 to about 8,000 (preferably in the range from 2,000 to 6,000). Examples of the preferred hydroxyl-containing compounds include polyethers, polyesters, polycarbonates, and polyester amides containing at least 2 (and generally 2 to 8, but preferably 2 to 6) hydroxyl groups of the type known for use in the production of homogeneous and cellular polyurethanes and described, for example, in German Offenlegungsschrift 2,832,253, pages 11 to 18. Such compounds preferably have an OH value of 28 to 56.

Optional component (c) includes compounds containing at least two isocyanate-reactive hydrogen atoms and having a molecular weight in the range from 32 to 399. As with component (b) described above, suitable compounds (c) include compounds containing hydroxyl groups and/or amino groups and/or thiol groups and/or carboxyl groups (preferably compounds containing hydroxyl groups and/or amino groups) which serve as chain-extending agents or crosslinking agents. Suitable compounds generally contain 2 to 8 (preferably 2 to 4) isocyanate-reactive hydrogen atoms. Examples of these compounds can be found in German Offenlegungsschrift 2,832,253, pages 10 to 20.

Water is used as blowing agent in a quantity of about 5 to about 15 parts by weight per 100 parts by weight of the "polyol component" (b).

Optional auxiliaries and additives include (i) other blowing agents, such as readily volatile organic substances; (ii) known reaction accelerators and reaction retarders, used in typical quantities; and (iii) surface-active additives, such as emulsifiers and foam stabilizers; known cell regulators, such as paraffins or fatty alcohols or dimethyl polysiloxanes; pigments or dyes; and known flameproofing agents, such as tris(chloroethyl) phosphate or tricresyl phosphate; stabilizers against the effects of aging and weathering; plasticizers: fungistatic and bacteriostatic agents; and fillers, such as barium sulfate, kieselguhr, carbon black, or whiting.

These optional auxiliaries and additives are described, for example, in German Offenlegungsschrift 2,732,292, pages 21 to 24. Further examples of surface-active additives, cell regulators, reaction retarders, stabilizers, flameproofing agents, plasticizers, dyes, fillers, and fungistatic and bacteriostatic agents, as well as information on their use and their mode of action, can be found in *Kunststoff-Handbuch*, Vol. VII, edited by Vieweg and Höchtlen, Carl-Hanser-Verlag, Munich 1966, for example, on pages 103 to 113.

To carry out the process according to the invention, the reaction components are reacted by the known one-shot process, prepolymer process, or semi-prepolymer process, often using machines such as the type described in U.S. Pat. No. 2,764,565. Particulars of processing machines which may also be used in accordance with the invention can be found in *Kunststoff-Handbuch*, Vol. VII, edited by Vieweg and Höchtlen, Carl-Hanser-Verlag, Munich 1966, for example, on pages 121 to 205.

When carrying out the process according to the invention, all of the components are generally reacted at an index of 90 to 115 and preferably at an index of 95 to 105. The index, a term commonly used in the production of polyurethane foams, gives some indication of the degree of crosslinking of a foam. It is customary to regard a foam in which isocyanate has been used in a quantity corresponding to the stoichiometric ratios or in the theoretically necessary quantity as having been made with an index of 100. Accordingly, the index allows the degree of undercrosslinking or overcrosslinking to be more closely defined. The index is calculated in accordance with the following general equation:

$$\text{index} = \frac{\text{quantity of isocyanate (actual)}}{\text{quantity of isocyanate (theoretical)}} \times 100$$

Foaming according to the invention is often carried out advantageously by the cold foaming process in closed molds. In this process, the reaction mixture is introduced into a mold which may be made of metal (for example, aluminum) or of plastic (for example, epoxy resin). The foamable reaction mixture foams in the mold and forms the molding. A foamable reaction mixture may be introduced into the mold in such a quantity that the mold formed just fills the mold. A larger quantity of foamable reaction mixture than is necessary to fill the interior of the mold with foam may, however, also be introduced into the mold, a technique known as overcharging and described, for example, in U.S. Pat. Nos. 3,178,490 and 3,182,104.

The flexible polyurethane foams obtainable in accordance with the invention can be used, for example, as instrument panels, arm rests (including car arm rests), cushions for sofas and chairs, head rests, and seats for motor vehicles (preferably automobiles).

The following examples further illustrate details for the preparation of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight.

EXAMPLES

Example 1 Preparation of a flexible polyurethane foam

A-component (polyol formulation)

| | |
|---|---|
| 70 parts | a polyether polyol (OH value 28) prepared by propoxylation of trimethylolpropane and subsequent ethoxylation |
| 30 parts | a polyhydrazodicarbonamide-filled polyether polyol (OH value 28) (Bayfit ® 3619, a product of Bayer AG) |
| 3.6 parts | water |
| 0.1 part | bis(dimethylaminoethyl) ether |
| 0.25 part | 33% solution of diazabicyclo[2.2.2]octane in dipropylene glycol |
| 0.25 part | N,N-bis(dimethylaminopropyl)formamide |
| 0.2 part | a commercially available crosslinking agent based on aliphatic polyamines (PU-Vernetzer 56, a product of Bayer AG) |
| 1.5 parts | a commercially available silicone stabilizer (KS 43, a product of Bayer AG) |

B component (polyisocyanate mixture)

Mixture of 70% by weight of TDI 65 and 30% by weight of a crude MDI having the following composition:

60% by weight 4,4'-diphenylmethane diisocyanate
23% by weight 2,4'-diphenylmethane diisocyanate
2% by weight 2,2'-diphenylmethane diisocyanate
15% by weight polyphenyl polymethylene polyisocyanates The A component (100 parts by weight) was mixed in a high-pressure machine with the B component (38.2 parts by weight). The reaction mixture was introduced into a 40 liter box mold heated to about 50 C. The mold was closed and after about 6 minutes the molding was removed from the mold. The full weight was 1.87 kg. The flexible foam obtained exhibited the following properties, as determined by mechanical tests:

| Test results: | |
|---|---|
| Density (DIN 53,420) | 43.1 kg/m$^3$ |
| Compression hardness 40% (DIN 53,577) | 4.1 kPa |
| Tensile strength (DIN 53,571) | 194 kPa |
| Elongation at break (DIN 53,571) | 183% |
| Compression set (50% C$_t$ value) (DIN 53,572) | 6.1% |

Example 2 (Comparison)—Preparation of a molded flexible polyurethane foam

A component

Identical to A component of Example 1

B component

Mixture of 70% by weight of TDI 65 and 30% by weight of a mixture of diphenylmethane diisocyanates and polyphenyl polymethylene polyisocyanates having the following composition:

50% by weight 4,4'-diphenylmethane diisocyanate
3% by weight 2,4'-diphenylmethane diisocyanate
47% by weight polyphenyl polymethylene polyisocyanates The mixing ratio and preparative conditions corresponded to Example 1. The resulting polyurethane foam had the following properties:

| Test results: | |
|---|---|
| Density (DIN 53,420) | 42.6 kg/m$^3$ |
| Compression hardness 40% (DIN 53,577) | 3.6 kPa |
| Tensile strength (DIN 53,571) | 144 kPa |
| Elongation at break (DIN 53,571) | 129% |
| Compression set (50% C$_t$ value) (DIN 53,572) | 5.1% |

Comparison of the two Examples clearly shows that the tensile properties of the foam obtained from the polyisocyanate mixture according to the invention are distinctly improved.

What is claimed is:

1. A polyisocyanate mixture comprising
(A) 21 to 95% by weight of toluene diisocyanate and
(B) 5 to 79% by weight of a mixture of diphenylmethane diisocyanates and polyphenyl polymethylene polyisocyanates comprising
  (1) 55 to 87% by weight of 4,4'-diphenylmethane diisocyanate,
  (2) 8 to 30% by weight of 2,4'-diphenylmethane diisocyanate,
  (3) 0 to 4% by weight of 2,2'-diphenylmethane diisocyanate, and
  (4) 5 to 35% by weight of polyphenyl polymethylene polyisocyanates.

2. A polyisocyanate mixture according to claim 1 wherein component (B) comprises
  (1) 60 to 75% by weight of 4,4'-diphenylmethane diisocyanate,
  (2) 10 to 25% by weight of 2,4'-diphenylmethane diisocyanate,
  (3) 1 to 3% by weight of 2,2'-diphenylmethane diisocyanate, and
  (4) 10 to 30% by weight of polyphenyl polymethylene polyisocyanates.

3. A process for the preparation of a flexible polyurethane foam comprising reacting
(a) a polyisocyanate mixture comprising
  (A) 21 to 95% by weight of toluene diisocyanate and
  (B) 5 to 79% by weight of a mixture of diphenylmethane diisocyanates and polyphenyl polymethylene polyisocyanates comprising
    (1) 55 to 87% by weight of 4,4'-diphenylmethane diisocyanate,
    (2) 8 to 30% by weight of 2,4'-diphenylmethane diisocyanate,
    (3) 0 to 4% by weight of 2,2'-diphenylmethane diisocyanate, and
    (4) 5 to 35% by weight of polyphenyl polymethylene polyisocyanates
with
(b) a compound containing at least two isocyanate-reactive hydrogen atoms and having a molecular weight in the range from 400 to 10,000 and
(c) optionally, a chain-extending agent and/or cross-linking agent containing at least two isocyanate-reactive hydrogen atoms and having a molecular weight in the range from 32 to 399;
in the presence of
(d) water as blowing agent.

4. A process according to claim 3 additionally comprising
(e) other blowing agents, catalysts, and auxiliaries and additives.

5. A process according to claim 3 wherein component (B) comprises
  (1) 60 to 75% by weight of 4,4'-diphenylmethane diisocyanate,
  (2) 10 to 25% by weight of 2,4'-diphenylmethane diisocyanate,
  (3) 1 to 3% by weight of 2,2'-diphenylmethane diisocyanate, and
  (4) 10 to 30% by weight of polyphenyl polymethylene polyisocyanates.

6. A process according to claim 3 for the preparation of a flexible polyurethane foam comprising reacting
(a) a polyisocyanate mixture comprising
  (A) 21 to 95% by weight of toluene diisocyanate and
  (B) 5 to 79% by weight of a mixture of diphenylmethane diisocyanates and polyphenyl polymethylene polyisocyanates comprising
    (1) 60 to 75% by weight of 4,4'-diphenylmethane diisocyanate,
    (2) 10 to 25% by weight of 2,4'-diphenylmethane diisocyanate,
    (3) 1 to 3% by weight of 2,2'-diphenylmethane diisocyanate, and
    (4) 10 to 30% by weight of polyphenyl polymethylene polyisocyanates with
(b) a compound containing at least two isocyanate-reactive hydrogen atoms and having a molecular weight in the range from 400 to 10,000 and
(c) optionally, a chain-extending agent and/or cross-linking agent containing at least two isocyanate-reactive hydrogen atoms and having a molecular weight in the range from 32 to 399;

in the presence of (d) water as blowing agent and
(e) other blowing agents, catalysts, and auxiliaries and additives.

7. A process according to claim 3 wherein the components react in a closed mold to form a cold-curing flexible polyurethane foam.

8. A process according to claim 6 wherein the components react in a closed mold to form a cold-curing flexible polyurethane foam.

* * * * *

UNITED STATES PATENT AND TRADEMARK OFFICE
CERTIFICATE OF CORRECTION

PATENT NO. : 5,132,334
DATED : July 21, 1992
INVENTOR(S) : Peter Gansen and Hans-Joachim Kogelnik It is certified that error appears in the above-identified patent and that said Letters Patent is hereby corrected as shown below:

On the title page, insert --Assignee: Bayer Aktiengesellschaft, Leverkusen, Fed. Rep. of Germany--.

On the title page, insert --Attorney, Agent or Firm: Joseph C. Gil, Richard E.L. Henderson--.

At column 2, line 33, after "60 to 75%", insert --by weight--.

At column 2, line 57, after "include", delete "be".

Signed and Sealed this

Twelfth Day of October, 1993

Attest:

BRUCE LEHMAN

Attesting Officer

Commissioner of Patents and Trademarks